(12) United States Patent
Galijan

(10) Patent No.: US 7,351,025 B2
(45) Date of Patent: Apr. 1, 2008

(54) AGGREGATE HANDLING SYSTEM

(75) Inventor: Michael N. Galijan, Keilor (AU)

(73) Assignee: Intray Consolidated Pty. Ltd., Keilor (AU)

( * ) Notice: Subject to any disclaimer, the term of this patent is extended or adjusted under 35 U.S.C. 154(b) by 234 days.

(21) Appl. No.: 11/000,807

(22) Filed: Dec. 1, 2004

(65) Prior Publication Data

US 2006/0114743 A1 Jun. 1, 2006

(51) Int. Cl.
*G01G 19/32* (2006.01)
(52) U.S. Cl. .................... 414/21; 366/30; 198/541; 177/134
(58) Field of Classification Search .............. 366/18, 366/30, 141, 153.3; 198/540, 541, 959; 177/133–135; 414/21

See application file for complete search history.

(56) References Cited

U.S. PATENT DOCUMENTS

| | | | | |
|---|---|---|---|---|
| 3,110,421 A | * | 11/1963 | Matthias | 222/57 |
| 3,162,316 A | * | 12/1964 | Camp | 414/21 |
| 3,198,494 A | * | 8/1965 | Curran et al. | 366/18 |
| 3,660,038 A | * | 5/1972 | Brewer | 209/387 |
| 4,089,509 A | * | 5/1978 | Morton et al. | 366/8 |
| 4,178,117 A | * | 12/1979 | Brugler | 414/21 |
| 4,204,773 A | * | 5/1980 | Bates | 366/18 |
| 6,186,654 B1 | * | 2/2001 | Gunteret et al. | 366/18 |

* cited by examiner

*Primary Examiner*—David Sorkin
(74) *Attorney, Agent, or Firm*—Westman, Champlin & Kelly

(57) ABSTRACT

An aggregate handling system includes an aggregate delivery station, which includes one or more delivery bays for receiving aggregate from a delivery truck. The system includes storage apparatus associated with each delivery bay and adapted to receive aggregate by gravity feeding from that delivery bay, wherein each storage apparatus includes one or more storage hoppers. The system also includes weigh apparatus associated with each storage apparatus and adapted to receive aggregate from that storage apparatus, wherein each weigh apparatus includes one or more weigh hoppers, and a conveyor for receiving aggregate from the weigh apparatus and being adapted to transfer aggregate to a batching area.

9 Claims, 3 Drawing Sheets

AGGREGATE HANDLING SYSTEM

FIELD OF THE INVENTION

The present invention relates to aggregate handling systems. Particularly, the present invention relates to aggregate for use in batching plants, such as concrete.

BACKGROUND OF THE INVENTION

Concrete batching plants must adhere to strict statutory requirements regarding the control of environmental conditions. One area that requires particular attention is the delivery, storage, weigh and transfer of aggregate, such as sand and gravel.

Aggregate is typically stored in storage bins. A loader, such as a front end loader, is used to periodically transport aggregate from the bin to an overhead storage hopper. A weigh hopper is generally situated directly below the storage hopper. A weighed amount of aggregate is gravity fed from the storage hopper into the weigh hopper and then transferred to a batching area.

The aggregate storage bins are situated at ground level, and are enclosed on three sides to shield the aggregate from wind. However, the top and at least one side of the bunker is open, exposing the aggregate to wind. Wind can disperse fine particulate matter, polluting both the plant and surrounding area. The loaders used to transport the aggregate are also open and further fine particulate matter is dispersed during transport.

One attempt to alleviate the dispersement of the aggregate is to locate the storage bin underground. However, loaders are still required to transport the aggregate from the bin to the overhead storage hopper.

The aggregate delivery, storage, weigh and transfer of aggregate in current concrete batching plants is complex, and installation and maintenance costs are high. The storage hoppers must be constantly replenished, with use of the loaders creating traffic hazards to plant employees. To allow manoeuvring of the loaders between the storage bin and the storage hopper, a significant amount of space is required within the plant for the aggregate delivery, storage, weigh and transfer. Common in all batching plants are the problems associated with dust and noise emissions.

It would be desirable to provide an aggregate delivery, storage, weigh and transfer system that alleviates or overcomes one or more problems associated with known systems.

SUMMARY OF THE INVENTION

An embodiment of the present invention provides an aggregate handling system, including an aggregate delivery station including one or more delivery bays for receiving aggregate from a delivery truck. Storage apparatus are associated with each delivery bay and adapted to receive aggregate by gravity feeding from that delivery bay. Each storage apparatus includes one or more storage hoppers. Weigh apparatus are associated with each storage apparatus and are adapted to receive aggregate from that storage apparatus. Each weigh apparatus includes one or more weigh hoppers. A conveyor receives aggregate from the weigh apparatus and is adapted to transfer aggregate to a batching area.

An embodiment of the present invention is also directed to a method of handling aggregate. The method includes: (a) receiving aggregate at a delivery bay of an aggregate delivery station from a delivery truck; (b) receiving the aggregate in a storage apparatus by gravity feeding from the delivery bay, wherein the storage apparatus includes one or more storage hoppers; (c) receiving a portion of the aggregate from the storage apparatus in a weigh apparatus associated with the storage apparatus, wherein the weigh apparatus includes one or more weigh hoppers; and (d) transferring the portion of the aggregate from the weigh apparatus to a batching area with a conveyor.

Preferably, the delivery bays are located at ground level, such that the delivery truck can drive onto or over the bays. Advantageously, the storage apparatus, weigh apparatus and at least part of the conveyor may be located below ground level. Each delivery bay, storage apparatus and weigh apparatus and a section of the conveyor are preferably all vertically aligned. The delivery station includes a plurality of delivery bays which preferably run in a same longitudinal direction as the conveyor.

Advantageously, each delivery bay includes a floor, the floor including openings that are dimensioned to allow aggregate to pass through to the storage apparatus whilst allowing a delivery truck to pass over the delivery bay floor.

Preferably, the floor includes a plurality of beams supporting a plurality of longitudinal members extending transversely across the beams, the longitudinal members being spaced to define the floor openings therebetween.

Positioning members adapted for receiving the longitudinal members may be affixed to the beams.

Advantageously, there is a wall that divides two adjacent delivery bays. The wall, preferably, extends between adjacent storage apparatus.

BRIEF DESCRIPTION OF THE DRAWINGS

The invention will now be described, by way of example only, with reference to the accompanying drawings, in which.

DETAILED DESCRIPTION OF ILLUSTRATIVE EMBODIMENTS

Figure 1:
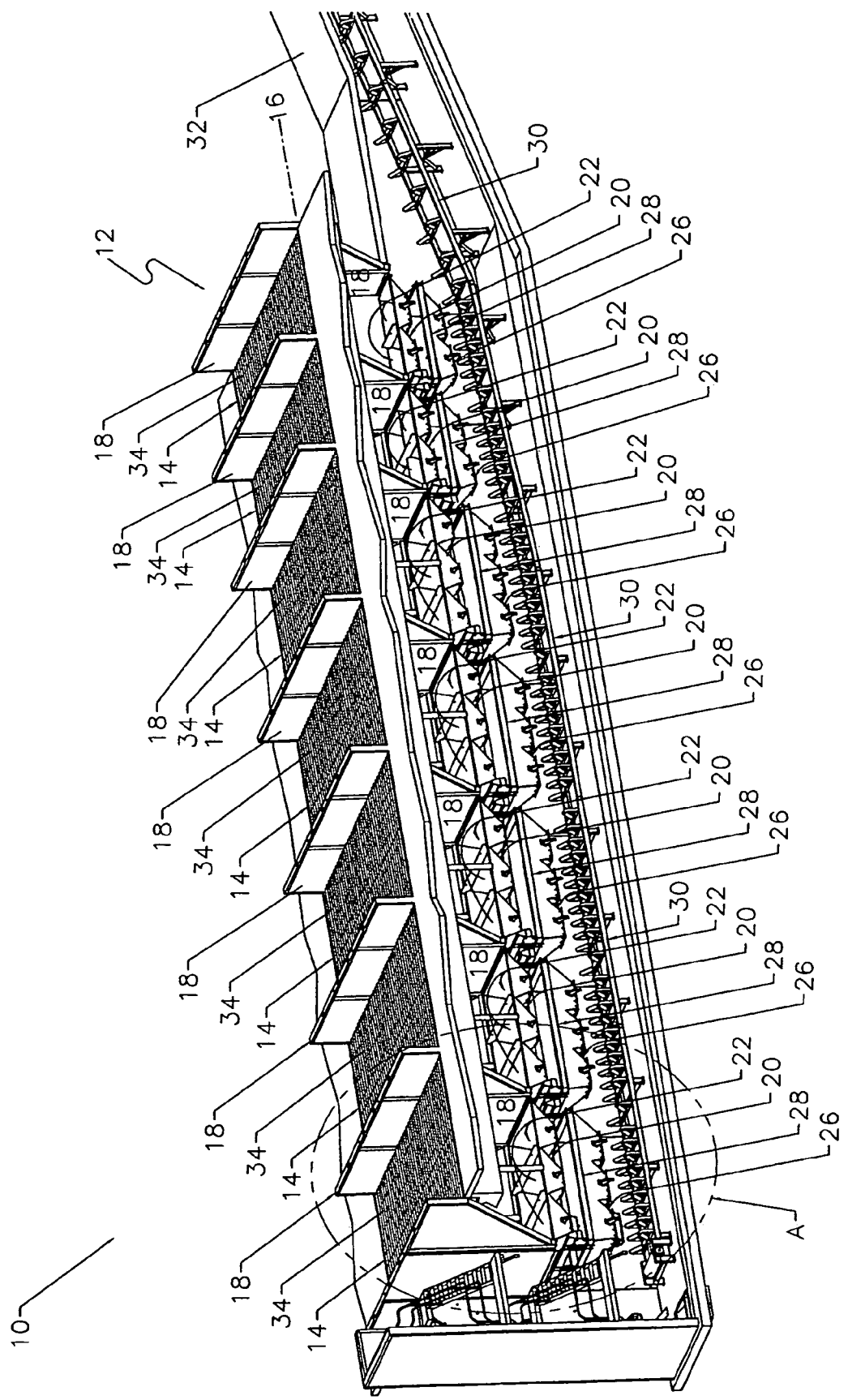
FIG. 1 shows a perspective view of an aggregate handling system according to the present invention.

An aggregate handling system 10 is illustrated and includes an aggregate delivery station 12 including one or more delivery bays 14 for receiving aggregate from a delivery truck (not shown). In the delivery station 12 illustrated in FIG. 1 there are seven delivery bays 14, however there may be any number and each may be used to deliver a different sort of aggregate, such as sand or gravel. Delivery bays 14 are preferably located at ground level 16. Adjacent delivery bays 14 are divided by a wall 18, and are dimensioned so that a delivery truck may drive through each delivery bay 14.

Figure 2:
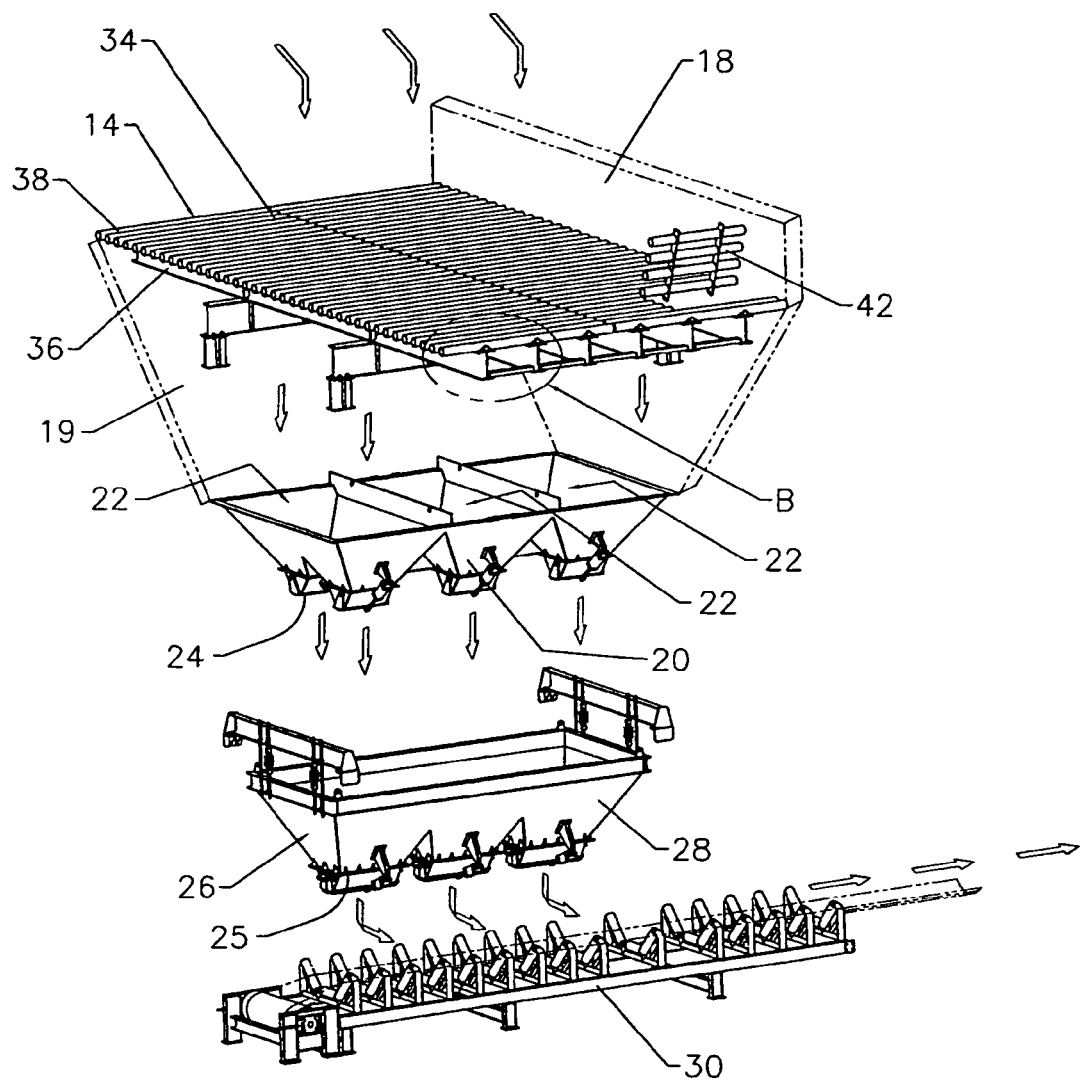
FIG. 2 shows an exploded perspective view of the section marked 'A' in FIG. 1.

System 10 includes storage apparatus 20 associated with each delivery bay 14, best shown in FIG. 2, and adapted to receive aggregate by gravity feeding from that delivery bay 14. Each storage apparatus 20 includes one or more storage hoppers 22. Illustrated in FIG. 2 are three storage hoppers 22, however, as can be seen in FIG. 1, any number of storage hoppers 22 may be included in each storage apparatus 20. The wall 18 dividing delivery bays 14 also extends between adjacent storage apparatus 20. A tilt panel 19 extends from the delivery bay 14 to the top of the storage hoppers 22 on both sides. The tilt panels 19 act as a continuation of the angled side walls of the storage hoppers 22, increasing their volume. It will be appreciated that all of the space between the storage hoppers 22 and the delivery bay 14 may contain aggregate.

Also included in the system 10 is weigh apparatus 26 associated with each storage apparatus 20 and adapted to receive aggregate from that storage apparatus 20. Each weigh apparatus 26 includes one or more weigh hoppers 28. The system 10 further includes a conveyor 30 for receiving aggregate from the weigh apparatus 26 and is adapted to transfer aggregate to a batching area (not shown).

The storage apparatus 20, weigh apparatus 26 and at least part of the conveyor 30 are located below ground level 16. The remainder of conveyor 30 may be located below ground level 16 or may be angled to transfer the aggregate to a batching area at or above ground level 16. As can be seen in FIG. 1, a section of the conveyor 30 may be exposed to the air, a dust cover 32 may be used to reduce dispersement of dust.

Figure 3:
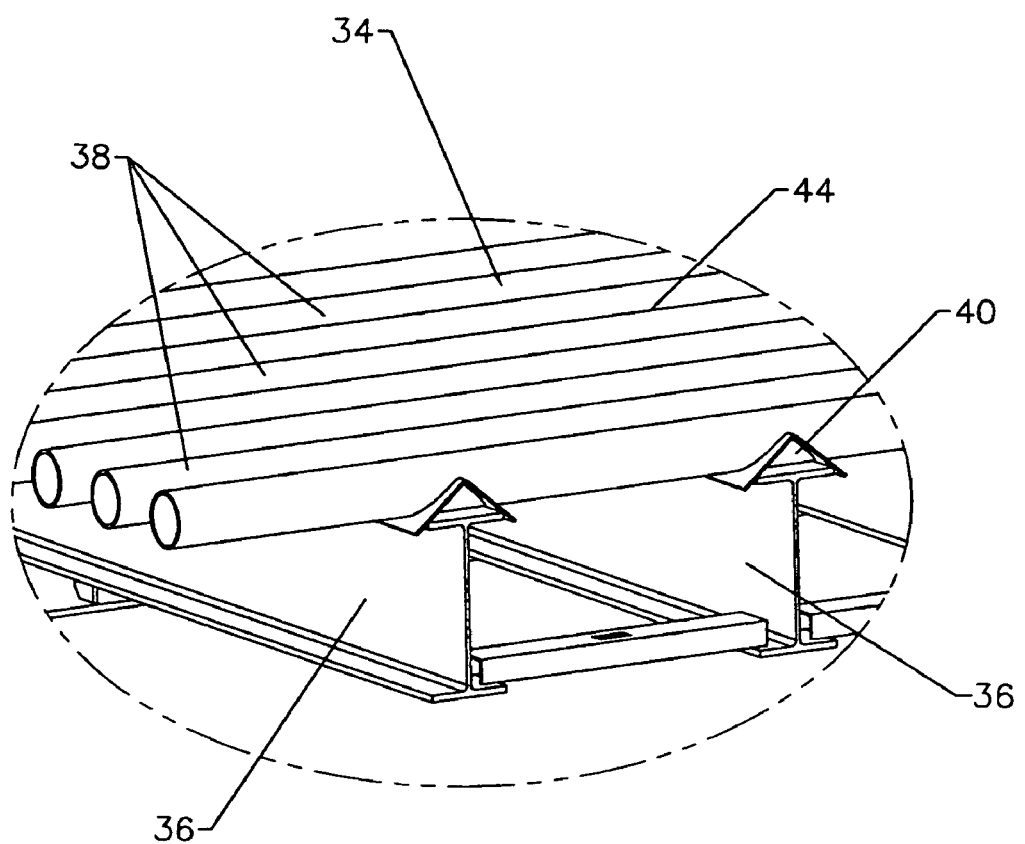
FIG. 3 shows a perspective view of the section marked 'B' in FIG. 2.

Each delivery bay 14 includes a floor 34, which includes openings 44 that are dimensioned to allow aggregate to pass through to the storage apparatus 20. The floor 34 include a plurality of beams 36 supporting a plurality of longitudinal members 38 extending transversely across the beams 36. The longitudinal members 38 are spaced to define the openings 44 therebetween, as shown in FIG. 3. The positioning members 40 are adapted for receiving the longitudinal members 38 and are affixed to the beams 36. The positioning members 40 have a triangular cross-section, with slots for the longitudinal members 38 to sit in. This construction prevents aggregate from piling up on top of the floor 34. The floor 34 also includes a manhole 42 to allow access to components below ground level 16, as shown in FIG. 2.

As can be best seen in FIG. 2, each delivery bay 14, storage apparatus 20 and weigh apparatus 26 are vertically aligned. Aggregate is dumped by the delivery truck onto floor 34 of the delivery bay 14, the aggregate falls into the storage hoppers 22 through openings 44. When required, the gates 24 of storage hopper 22 are opened and the aggregate gravity feeds into weigh hopper 28. When the correct amount is received into weigh hopper 28, the gates 24 close. The gates 25 on weigh hopper 28 are then opened and the aggregate is gravity fed onto conveyor 30, where it is transferred to the batching area.

The delivery station 12 includes a plurality of delivery bays 14 running in a same longitudinal direction as the conveyor 30. This means that as different types of aggregate is delivered into different delivery bays 14, each weigh apparatus may hold a different type of aggregate. As the delivery bays 14 run in the same longitudinal direction as the conveyor 30 and the delivery bays 14, storage apparatus 20 and weigh apparatus 26 are all vertically aligned, the conveyor 30 can receive different types of aggregate from the different weigh apparatus 26, creating a mixture for transfer to the batching area along one single conveyor 30.

This system 10 has advantages over known systems, including the need for only one conveyor, reducing complexity and maintenance. As all of the components of the system are associated there is no requirement for a loader to move aggregate from a storage bunker to an overhead storage hopper, thus reducing traffic in the plant. With the majority of the system being located below ground level, noise and dust emission is reduced.

It will be understood that the invention disclosed and defined in this specification extends to all alternative combinations of two or more of the individual features mentioned or evident from the text or drawings. All of these different combinations constitute various alternative aspects of the invention.

Although the present invention has been described with reference to preferred embodiments, workers skilled in the art will recognize that changes may be made in form and detail without departing from the spirit and scope of the invention.

What is claimed is:

1. An aggregate handling system, including:
    an aggregate delivery station including one or more delivery bays for receiving aggregate from a delivery truck, each bay having a floor onto which a truck may be driven for delivering aggregate onto the floor of the respective delivery bay;
    storage apparatus located below each delivery bay and below ground level, which storage apparatus is adapted to receive aggregate through openings in the floor of the delivery bay by gravity feeding from that delivery bay, wherein each storage apparatus includes one or more storage hoppers;
    weigh apparatus located below each storage apparatus and adapted to selectively receive aggregate from that storage apparatus by gravity, wherein each weigh apparatus includes one or more weigh hoppers; and
    a conveyor for selectively receiving aggregate from the weigh apparatus by gravity and being adapted to transfer aggregate to a batching area.

2. A system according to claim 1 wherein, at least part of the conveyor is located below ground level.

3. A system according to claim 1, wherein each delivery bay, storage apparatus and weigh apparatus are vertically aligned.

4. A system according to claim 3, wherein the delivery station includes a plurality of delivery bays arranged successively in a same longitudinal direction as the conveyor.

5. A system according to claim 1, wherein the floor includes a plurality of beams supporting a plurality of longitudinal members extending transversely across the beams, the longitudinal members being spaced to define the floor openings therebetween.

6. A system according to claim 5, wherein positioning members adapted for receiving the longitudinal members are affixed to the beams.

7. A system according to claim 1, wherein a wall divides two adjacent delivery bays.

8. A system according to claim 7, wherein the wall extends between adjacent storage apparatus.

9. A method of handling aggregate, the method comprising:
    (a) receiving aggregate at a delivery bay of an aggregate delivery station from a delivery truck, the delivery bay having a floor whereby the delivery truck drives onto or over the delivery bay and delivers aggregate onto said floor of the delivery bay;
    (b) receiving the aggregate in a storage apparatus below ground level by gravity feeding from the delivery bay located above, wherein the storage apparatus includes one or more storage hoppers;
    (c) receiving a portion of the aggregate by gravity from the storage apparatus in a weigh apparatus located below the storage apparatus, wherein the weigh apparatus includes one or more weigh hoppers; and
    (d) transferring the portion of the aggregate from the weigh apparatus by gravity to a conveyer and transferring the aggregate to a batching area with the conveyor.

* * * * *